US011696239B1

(12) United States Patent
Marupaduga (10) Patent No.: US 11,696,239 B1
(45) Date of Patent: Jul. 4, 2023

(54) REFERENCE SIGNAL ENHANCEMENT IN A WIRELESS COMMUNICATION NETWORK

(71) Applicant: T-MOBILE INNOVATIONS LLC, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 92 days.

(21) Appl. No.: 17/006,209

(22) Filed: Aug. 28, 2020

(51) Int. Cl.
*H04W 52/32* (2009.01)
*H04L 5/00* (2006.01)

(52) U.S. Cl.
CPC ......... *H04W 52/325* (2013.01); *H04L 5/0048* (2013.01)

(58) Field of Classification Search
CPC .................... H04W 52/325; H04L 5/0048
See application file for complete search history.

(56) References Cited

U.S. PATENT DOCUMENTS

| | | | |
|---|---|---|---|
| 7,848,292 B2 | 12/2010 | Bi et al. | |
| 8,098,713 B2 | 1/2012 | Baxley et al. | |
| 8,213,483 B2 | 7/2012 | Malladi | |
| 9,026,129 B2 | 5/2015 | Dean et al. | |
| 9,603,102 B2 | 3/2017 | Laroia et al. | |
| 9,762,356 B2 | 9/2017 | Rudolf et al. | |
| 2004/0038702 A1* | 2/2004 | Okawa | H04B 7/0689 455/522 |
| 2010/0097937 A1 | 4/2010 | Pietraski et al. | |
| 2010/0216497 A1* | 8/2010 | Kawasaki | H04W 72/1231 455/501 |
| 2012/0270593 A1* | 10/2012 | Park | H04W 52/343 455/522 |
| 2014/0313889 A1* | 10/2014 | Jeong | H04W 28/0284 370/230 |
| 2015/0230189 A1* | 8/2015 | Chen | H04W 16/28 455/522 |
| 2016/0198359 A1* | 7/2016 | Ryu | H04W 36/22 370/237 |
| 2016/0345331 A1* | 11/2016 | Seyama | H04W 52/243 |
| 2017/0055130 A1 | 2/2017 | LeBlanc et al. | |
| 2017/0171828 A1* | 6/2017 | Rao | H04W 52/226 |
| 2019/0215750 A1* | 7/2019 | Xu | H04W 8/08 |

* cited by examiner

*Primary Examiner* — Ian N Moore
*Assistant Examiner* — Sun Jong Kim (57) ABSTRACT

A primary wireless access node wirelessly transmits reference signals at an initial reference signal power level. The primary wireless access node exchanges data with User Equipment (UEs) and exchanges the data with other network elements. The primary wireless access node exchanges signaling with secondary wireless access nodes. The secondary wireless access nodes exchange data between the UEs and the network elements responsive to the signaling. The primary wireless access node determines the amount of the secondary nodes and determines a new reference signal power level based on the amount of the secondary nodes. The primary wireless access node wirelessly transmits subsequent reference signals at the new reference power level.

20 Claims, 9 Drawing Sheets

REFERENCE SIGNAL ENHANCEMENT IN A WIRELESS COMMUNICATION NETWORK

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices using wireless network protocols. Exemplary wireless network protocols include Fifth Generation New Radio (5GNR), Millimeter Wave, Long Term Evolution (LTE), Institute of Electrical and Electronic Engineers (IEEE) 802.11 (WIFI), and Low-Power Wide Area Network (LP-WAN). The wireless access nodes may group together to form a primary node and secondary nodes that all serve the same wireless user device in parallel.

The wireless communication networks use different frequency bands that are each several megahertz wide. The wireless access nodes broadcast Direct Current (DC) carrier signals at the middle of the frequency bands for detection by the wireless user devices. The wireless access nodes also transmit reference signals throughout the frequency bands for reception by the wireless user devices based on the location of the DC carrier. The wireless user devices use the reference signals for synchronization, channel estimation, uplink transmission, and downlink transmission. The frequency bands are allocated into Resource Elements (REs) of frequency and time. Some REs transport user data or network signaling while other REs transport the reference signals. The wireless access nodes transmit the user data and network signaling at various powers based on user location, beamforming, and the like. The wireless access nodes typically transmit the reference signals at a constant power.

Unfortunately, wireless user devices and wireless access nodes generate radio interference. Heavy loading increases this radio interference. The use of parallel wireless access nodes to serve individual wireless user devices also increases the radio interference. Strong radio interference challenges the wireless user devices to accurately receive wireless signals from the wireless access nodes. Moreover, strong radio interference causes problems when the wireless user devices receive the reference signals. The loss of the reference signals at the wireless user devices significantly degrades the wireless communication services during periods of high interference and loading.

TECHNICAL OVERVIEW

A primary wireless access node wirelessly transmits reference signals at an initial reference signal power. The primary wireless access node exchanges data with User Equipment (UEs) and exchanges the data with other network elements. The primary wireless access node exchanges signaling with secondary wireless access nodes. The secondary wireless access nodes exchange data between the UEs and the network elements responsive to the signaling. The primary wireless access node determines new amounts of secondary nodes and responsively determines new reference signal power levels based on the new amounts of secondary nodes. The primary wireless access node wirelessly transmits subsequent reference signals at the new reference power levels.

DETAILED DESCRIPTION

Figure 1:
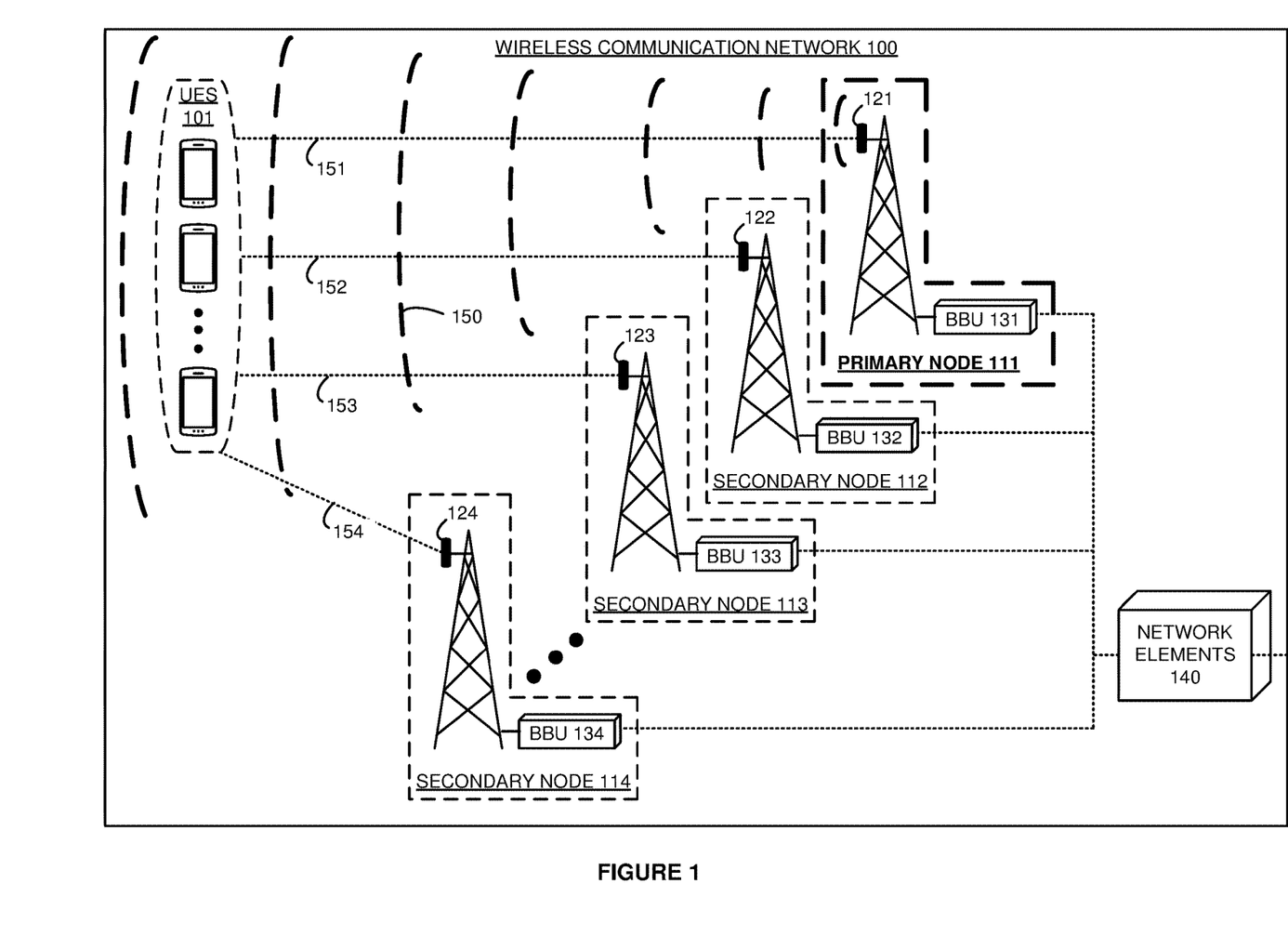
FIG. 1 illustrates a wireless communication network to wirelessly serve User Equipment (UEs) with enhanced reference signals.

FIG. 1 illustrates wireless communication network 100 to wirelessly serve User Equipment (UEs) 101 with enhanced reference signals 150. Wireless communication network 100 delivers wireless data services like internet-access, video-calling, media-streaming, augmented-reality, machine-control, and/or some other wireless networking product. Wireless communication network 100 comprises wireless UEs 101, primary wireless access node 111, secondary wireless access nodes 112-114, and network elements 140. Primary wireless access node comprises radio 121 and Baseband Unit (BBU) 131. Secondary wireless access nodes comprises respective radios 122-124 and BBUs 132-134. The number of secondary access nodes may larger than the amount shown.

Various examples of network operation and configuration are described herein. In some examples, radio 121 wirelessly transmits enhanced reference signals 150 at an initial reference power level. Radio 111 wirelessly exchanges data signals 151 with UEs 101 at different data power levels. UEs 101 use enhanced reference signals 150 to accurately receive and transmit data signals 151. Radio 111 exchanges the corresponding data with BBU 131, and BBU 131 exchanges the data with network elements 140. Network elements 140 may exchange the data with external systems like the internet. Radios 122-124 also transmit reference signals which may be enhanced but which are omitted from FIG. 1 for clarity.

BBU 131 exchanges signaling with BBUs 132-134. In response to the signaling, BBUs 132-134 exchange data between network elements 140 and radios 122-124. Radios 122-124 wirelessly exchange their corresponding data signals with UEs 101. BBU 131 determines the amount of secondary access nodes 122-124 that it controls to serve UEs 101. The amount is three in this example, but the amount may differ and typically varies over time. A rounded-average amount of these nodes may be used. BBU 131 determines new reference power levels based on new amounts of secondary access nodes. BBU 131 increases the reference power level as the amount of secondary nodes increases and decreases the reference power level as the amount of secondary nodes decreases. In response to BBU 131, radio 121 wirelessly transfers enhanced reference signals 150 at the new reference signal power levels.

In some examples, BBU 131 also determines the amount of UEs 101 that wirelessly exchange data signals 152-154 with secondary access nodes 112-114 under the control of BBU 131. A rounded-running average of these UEs may be used. BBU 131 determines the new reference power levels based on new amounts of secondary access nodes and/or new amounts of UEs 101. The amount of UEs 101 may be restricted to the amount of Radio Resource Control (RRC) Connected UEs or to the historical amount UEs (for the current day/date/time) instead of the total or actual amount of UEs 101. BBU 131 increases the reference power level as the amount of UEs increases and decreases the reference power level as the amount of UEs decreases.

In some examples, BBU 131 determines the amount interference at radio 121. BBU 131 determines the new reference power levels based on the amount of secondary access nodes and the amount of radio interference. BBU 131 increases the reference power level as the amount of interference increases and decreases the reference power level as the amount of interference decreases. The amount of interference may be grouped into different interference levels.

In some examples, BBU 131 determines individual amounts for individual secondary access nodes 1120114. The individual amounts comprise: UEs 101, RRC Connected UEs 101, historical UE amounts, and uplink radio interference. BBU 131 then determines individual secondary reference power levels for individual secondary access nodes 112-114 based their individual amounts of the foregoing. BBU 131 signals the individual secondary reference power levels to the individual secondary access nodes 112-114. Secondary access node 112-114 responsively transmit their individual secondary reference signals at their individual secondary reference signal power levels.

Advantageously, primary wireless access node 111 efficiently and effectively controls its reference signal power to help UEs 101 better receive the reference signals—especially during high loading and interference.

UEs 101 wirelessly communicate with wireless access nodes 111-114 over Radio Access Technologies (RATs) like Fifth Generation New Radio (5GNR), millimeter wave, Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. Wireless access nodes 111-114 communicate with each other and with network elements 140 over data links. Network elements 140 communicate with external systems like the internet over data links. The data links use metal, glass, air, or some other media. The data links use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, inter-processor communication, bus interfaces, and/or some other data communication protocols.

Although UEs 101 are depicted as smartphones, UEs 101 might instead comprise computers, robots, vehicles, or some other data appliances with wireless communication circuitry. Radios 111-114 are depicted on towers, but radios 111-114 may use other mounting structures or no mounting structure at all. Wireless access nodes 111-114 may comprise gNodeBs, eNodeBs, hot-spots, base-stations, and/or some other form of wireless network transceivers. Network elements 140 comprise Access and Mobility Management Functions (AMFs), User Plane Functions (UPFs), millimeter wave controllers, Mobility Management Entities (MMEs), Gateways (GWs), Internet-of-Things (IoT) application servers, Content Delivery Network (CDN) servers, and/or some other form of wireless network apparatus. In some examples, network elements 140 comprise Virtual Network Functions (VNFs) in a Network Function Virtualization Infrastructure (NFVI).

UEs 101 and wireless access nodes 111-114 comprise antennas, amplifiers, filters, modulation, analog/digital interfaces, microprocessors, software, memories, transceivers, bus circuitry, and the like. BBUs 131-134 and network elements 140 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, network applications, and management applications. The microprocessors retrieve the software from the memories and execute the software to drive the operation of wireless communication network 100 as described herein.

Figure 2:
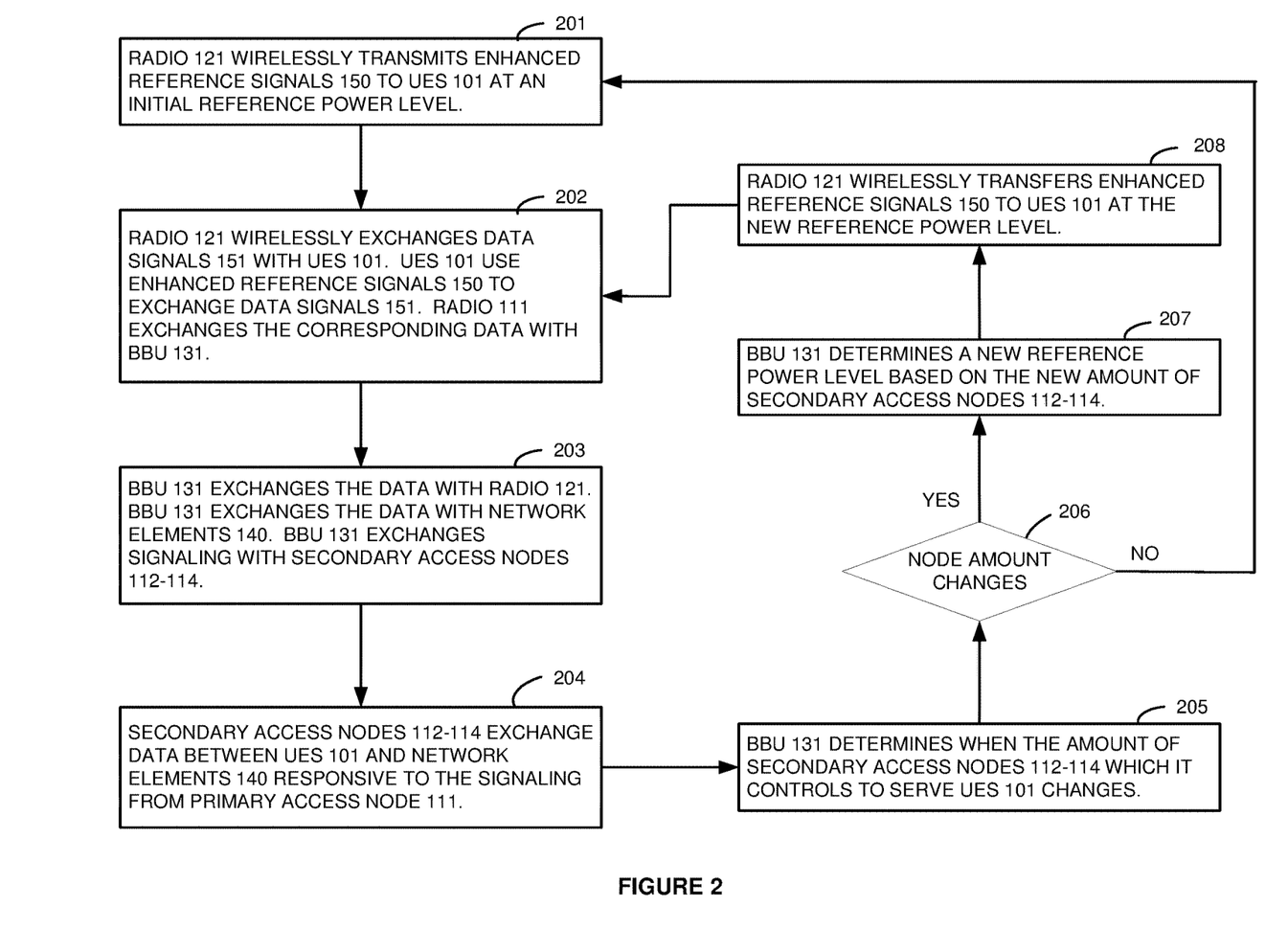
FIG. 2 illustrates an exemplary operation of the wireless communication network to wirelessly serve the UEs with the enhanced reference signals.

FIG. 2 illustrates an exemplary operation of wireless communication network 100 to wirelessly serve UEs 101 with enhanced reference signals 150. In primary access node 111, radio 121 wirelessly transmits enhanced reference signals 150 to UEs 101 at an initial reference power level (201). Radio 111 wirelessly exchanges data signals 151 with UEs 101 at data power levels (202). UEs 101 use enhanced reference signals 150 to exchange data signals 151 (202). Radio 111 exchanges the corresponding data with BBU 131 (202). BBU 131 exchanges the data with network elements 140 (203).

BBU 131 exchanges signaling with secondary access nodes 112-114 (203). Secondary access nodes 112-114 exchange data between UEs 101 and network elements 140 (204). BBU 131 determines when the amount of secondary access nodes 112-114 that it controls to serve UEs 101 changes (205). When the amount of secondary access nodes 112-114 does not change (206), the operation repeats using the initial reference signal power level (201). When the amount of secondary access nodes 112-114 changes (206), BBU 131 determines a new reference power level based on the new amount of secondary access nodes 112-114 (207). BBU 131 increases the primary reference power as the amount of secondary nodes increases and decreases the primary reference power as the amount of secondary nodes decreases. Radio 121 wirelessly transfers enhanced reference signals 150 to UEs 101 at the new reference power level (208). The operation then repeats using the new reference signal power level (202).

Figure 3:
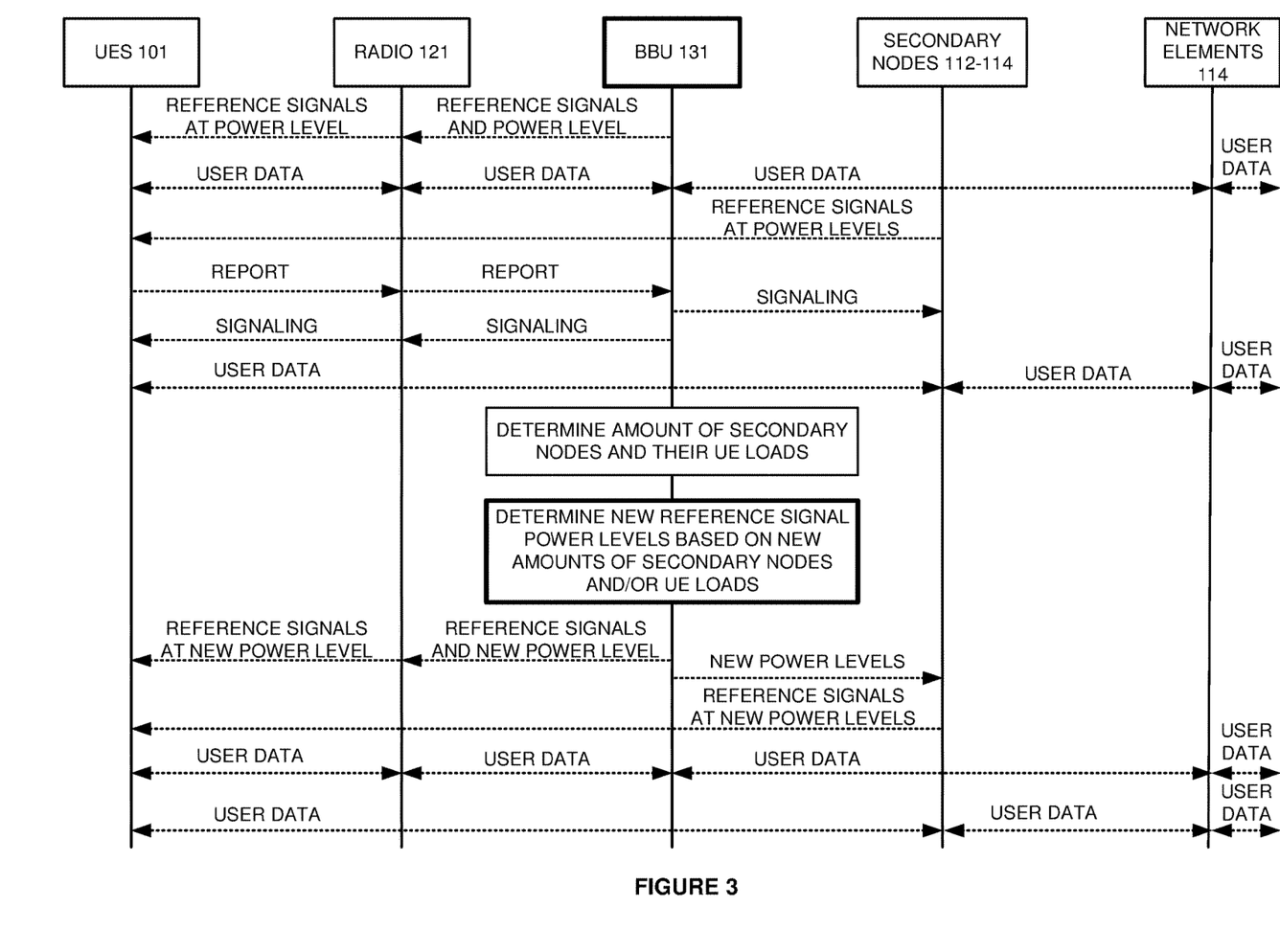
FIG. 3 illustrates an exemplary operation of the wireless communication network to wirelessly serve the UEs with the enhanced reference signals.

FIG. 3 illustrates an exemplary operation of wireless communication network 100 to wirelessly serve UEs 101 with enhanced reference signals 150. In this example, BBU 131 uses the node amount and a UE load metric to control both the primary and secondary reference signal power, although in other examples, BBU 131 may not use the UE load or control secondary reference power. BBU 131 indicates enhanced reference signals 150 and a reference power level to radio 121. Radio 121 wirelessly transmits enhanced reference signals 150 at the indicated reference power level. Radio 111 wirelessly exchanges user data with UEs 101 using other data power levels. Radio 111 exchanges the user data with BBU 131. BBU 131 exchanges the user data with network elements 140. Network elements 140 exchange the user data with external systems.

Secondary access nodes 111-114 wirelessly transmit their individual reference signals at their individual reference signal power levels. UEs 101 receive the reference signals from secondary access nodes 112-114. UEs 101 measure and report radio metrics for the reference signals to BBU 131 over radio 121. In this example, BBU 131 processes the radio metrics to select secondary access nodes 112-114 to serve UEs 101. A different set of secondary access nodes might be selected in other examples. BBU 131 exchanges signaling with selected secondary access nodes 112-114. In response to the signaling, selected secondary access nodes 112-114 exchange user data between UEs 101 and network elements 140.

BBU 131 determines the amount of selected secondary access nodes 122-124 that serve UEs 101. BBU 131 determines the individual amounts of UEs 101 that are served by individual secondary access nodes 122-124. BBU 131 determines new primary reference power levels based on new amounts of secondary access nodes 122-124 and/or new amounts of UEs 101. BBU 131 increases the primary reference power level as the amount of secondary nodes and/or UEs increases and decreases the primary reference power as the amount of secondary nodes and/or UEs decreases. Node increases may offset UE decreases, and node decreases may offset UE increases.

BBU 131 determines new individual secondary reference power levels for individual secondary access nodes 122-124 responsive to their new amounts of UEs 101. BBU 131 increases the secondary reference power as the amount of UEs increases and decreases the secondary reference power as the amount of UEs decreases. BBU 131 signals the individual secondary reference power levels to individual secondary access nodes 112-114.

Radio 121 wirelessly transfers enhanced reference signals 150 at the new primary reference signal power levels. Secondary access nodes 112-114 transmit their secondary reference signals at their individual secondary reference signal power levels. Based on the reference signals, radio 111 wirelessly exchanges user data with UEs 101. Radio 111 exchanges the user data with BBU 131. BBU 131 exchanges the user data with network elements 140. Based on the reference signals, secondary access nodes 112-114 exchange user data with UEs 101. Secondary access nodes 112-114 exchange the user data with network elements 140, and network elements 140 exchange the user data with external systems.

Figure 4:
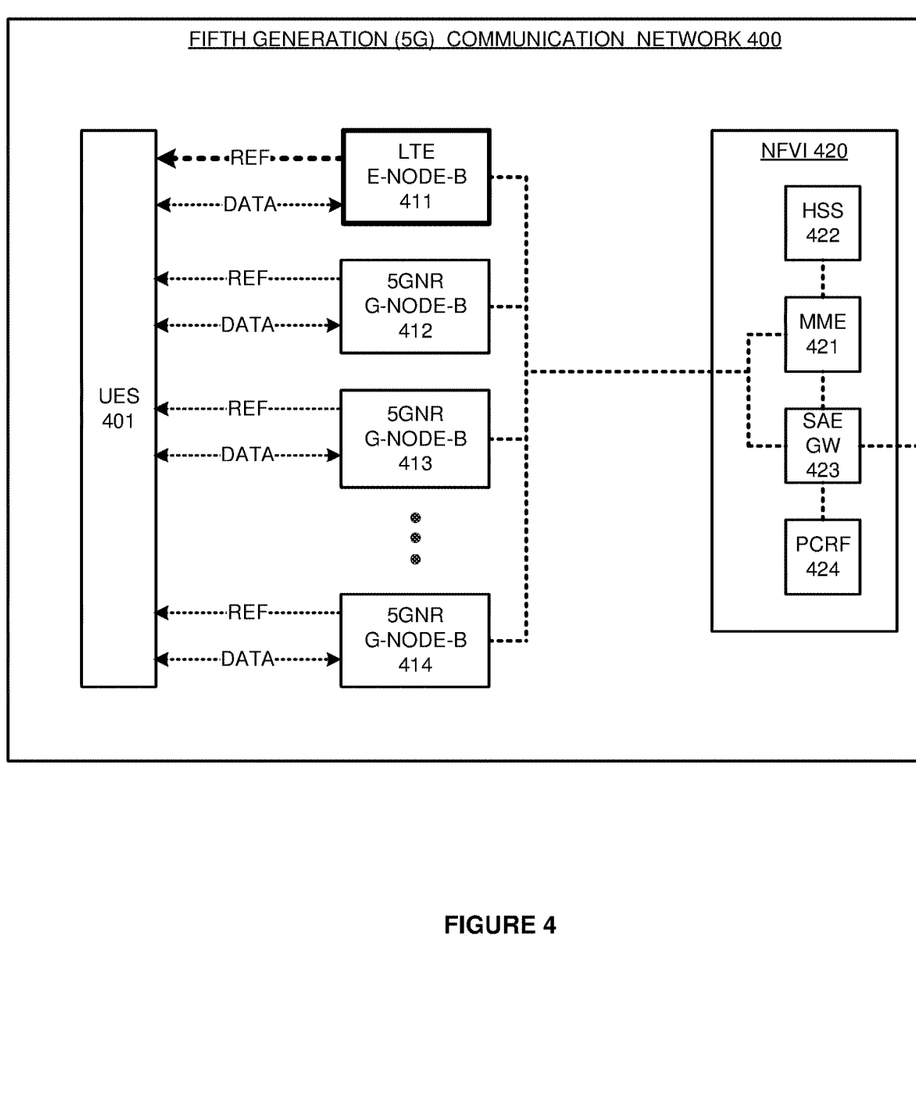
FIG. 4 illustrates a Fifth Generation (5G) wireless communication network to wirelessly serve UEs with enhanced reference signals.

FIG. 4 illustrates Fifth Generation (5G) communication network 400 to wirelessly serve UEs 401 with enhanced reference signals. 5G communication network 400 comprises an example of wireless communication network 100, although network 100 may differ. 5G communication network 400 comprises UEs 401, Long Term evolution (LTE) eNodeB 411, Fifth Generation New Radio (5GNR) gNodeBs 412-414, and Network Function Virtualization Infrastructure (NFVI) 420. NFVI 420 comprises Mobility Management Entity (MME) 421, Home Subscriber System (HSS) 422, System Architecture Evolution Gateway (SAE GW) 423, and Policy Charging and Rules Function (PCRF) 424. The number of 5GNR gNodeBs has been restricted for clarity.

LTE eNodeB 411 wirelessly broadcasts a Direct Current (DC) carrier in the middle of an LTE frequency band. LTE eNodeB 411 wirelessly transmits the enhanced reference signals throughout the LTE frequency band at an LTE reference signal power. UEs 401 detect the DC carrier and locate these enhanced reference signals. UEs 401 receive and process the enhanced reference signals to perform synchronization, channel estimation, uplink transmission, and downlink reception with LTE eNodeB 411.

UEs 401 and LTE eNodeB 411 exchange LTE attachment signaling. LTE eNodeB 411 and MME 421 exchange S1 attachment signaling. MME 421 and HSS 422 exchange Diameter signaling to authenticate and authorize UEs 401 and to select services for UEs 401. MME 421, SAE GW 423, and PCRF 424 exchange signaling to select Quality-of-Service (QoS) and network addresses for UEs 401. MME 421 signals LTE eNodeB 411 to serve UEs 401 per the QoS and network addresses. LTE eNodeB 411 signals UEs 401 indicating the selected services, QoS, and network addresses. UEs 401 and LTE eNodeB 411 wirelessly exchange data to deliver the selected services per the QoS. LTE eNodeB 411 and SAE GW 423 exchange the data to deliver the selected services per the QoS. SAE GW 423 exchanges the data with external systems to deliver the selected services per the QoS.

5GNR gNodeBs 412-414 wirelessly broadcast their own DC carriers in the middle of their 5GNR frequency bands. 5GNR gNodeBs 412-424 wirelessly transmit enhanced reference signals throughout their 5GNR frequency bands at reference signal power levels. UEs 401 detect the DC carriers and locate the enhanced reference signals. UEs 401 receive and process the enhanced reference signals to perform synchronization, channel estimation, uplink transmission, and downlink reception with 5GNR gNodeBs 412-414.

UEs 401 detect Received Signal Receive Power (RSRP) and Received Signal Receive Quality (RSRQ) for 5GNR gNodeBs 412-414 during channel estimation using the reference signals. UEs 401 transfer their RSRP/RSRQ values for 5GNR gNodeBs 412-414 to LTE eNodeB 411. LTE eNodeB 411 selects individual 5GNR gNodeBs to serve UEs 401 based on the RSRP/RSRQ values. In this example, LTE eNodeB 411 selects 5GNR gNodeBs 412-414 to serve UEs 401, although other amounts of 5GNR gNodeBs could be controlled and selected.

LTE eNodeB 411 signals selected 5GNR gNodeBs 412-414 to serve UEs 401. LTE eNodeB 411 signals MME 421 to serve UEs 401 over selected 5GNR gNodeBs 412-414. MME 421 signals SAE GW 423 to serve UEs 401 over selected 5GNR gNodeBs 412-414. UEs 401 and selected 5GNR gNodeBs 412-414 wirelessly exchange data to deliver the selected services per the QoS. 5GNR gNodeBs 412-414 and SAE GW 423 exchange the data to deliver the selected services per the QoS. SAE GW 423 exchanges the data with external systems to deliver the selected services per the QoS.

LTE eNodeB 411 determines the amount of selected 5GNR gNodeBs 122-124 that serve UEs 401 for LTE eNodeB 411. LTE eNodeB 411 determines the individual amounts of RRC Connected UEs 401 that are served by individual 5GNR gNodeBs 412-414. RRC Connected UEs 401 have an RRC Connection to the RRC in LTE eNodeB 411 over 5GNR gNodeBs 412-414, and RRC Connected UEs 401 are not RRC Idle or RRC Inactive. LTE eNodeB 411 determines its uplink interference. 5GNR gNodeBs 412-414 determine and report their uplink interference to LTE eNodeB 411.

LTE eNodeB 411 determines its reference signal power based on the amount of 5GNR gNodeBs 122-124, the amount of RRC Connected UEs 401, and its own uplink interference. LTE eNodeB 411 increases its reference signal power as the amount of 5GNR gNodeBs, UEs, or uplink interference increases and decreases its reference signal power as the amount of 5GNR gNodeBs, UEs, or uplink interference decreases. Some increases will offset other decreases in some cases.

LTE eNodeB 411 determines individual 5GNR reference signal power levels for 5GNR gNodeBs 412-414 based on their individual amounts of RRC Connected UEs 401 and their individual uplink interference. LTE eNodeB 411 increases 5GNR gNodeB reference signal power as the amount of UEs or uplink interference increases and decreases 5GNR gNodeB reference signal power as the amount of UEs or uplink interference decreases. LTE eNodeB 411 signals the individual 5GNR reference power levels to individual 5GNR gNodeBs 412-414.

LTE eNodeB 411 wirelessly transmits subsequent reference signals throughout its LTE frequency band at the selected reference signal power level. UEs 401 receive and process the reference signals to perform synchronization, channel estimation, uplink transmission, and downlink reception. UEs 401 and LTE eNodeB 411 wirelessly exchange data to deliver the selected services per the QoS. LTE eNodeB 411 and SAE GW 423 exchange the data to deliver the selected services per the QoS. SAE GW 423 exchanges the data with external systems to deliver the selected services per the QoS.

5GNR gNodeBs 412-424 wirelessly transmit subsequent reference signals throughout their 5GNR frequency bands at the selected reference signal power levels. UEs 401 receive and process the reference signals to perform synchronization, channel estimation, uplink transmission, and downlink reception. UEs 401 and 5GNR gNodeBs 412-414 wirelessly exchange data to deliver the selected services per the QoS. 5GNR gNodeBs 412-414 and SAE GW 423 exchange the data to deliver the selected services per the QoS. SAE GW 423 exchanges the data with external systems to deliver the selected services per the QoS.

Figure 5:
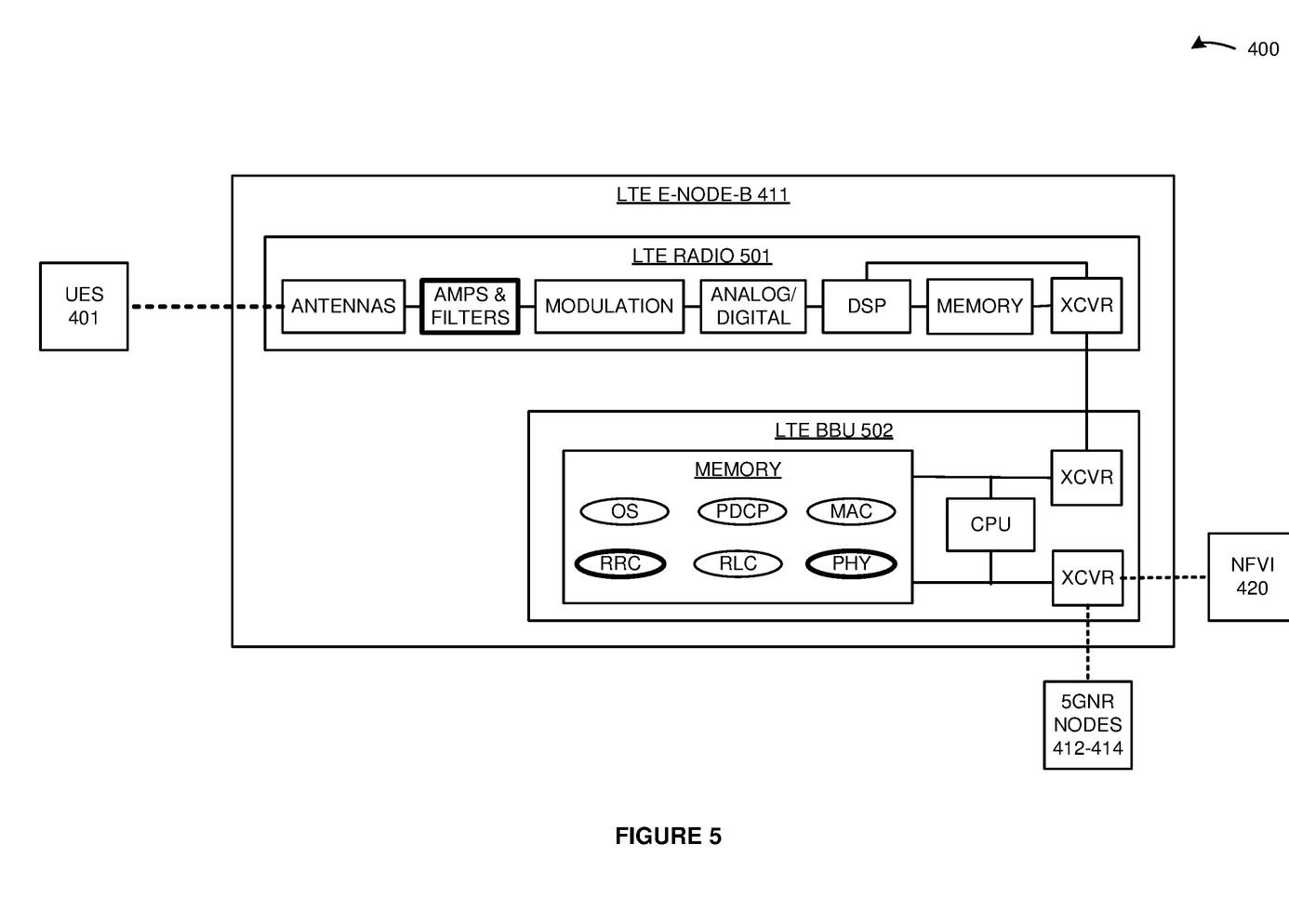
FIG. 5 illustrates a Long Term Evolution (LTE) eNodeB to wirelessly serve the UEs with the enhanced reference signals.

FIG. 5 illustrates LTE eNodeB 411 to wirelessly serve UEs 401 with the enhanced reference signals. LTE eNodeB 411 comprises an example of primary wireless access node 111, although primary node 111 may differ. LTE eNodeB 411 comprises LTE radio 501 and LTE Baseband Unit (BBU) 502. LTE radio 501 comprises antennas, amplifiers, filters, modulation, analog-to-digital interfaces, DSP, memory, and transceivers that are coupled over bus circuitry. LTE BBU 502 comprises memory, CPU, and transceivers that are coupled over bus circuitry. The memory in LTE BBU 502 stores an operating system (OS) and LTE network applications like Physical Layer (PHY), Media Access Control (MAC), Radio Link Control (RLC), Packet Data Convergence Protocol (PDCP), and Radio Resource Control (RRC). UEs 401 are wirelessly coupled to the antennas in LTE radio 501 over LTE links. A transceiver in LTE radio 501 is coupled to a transceiver in LTE BBU 502 over Common Public Radio Interface (CPRI) links. A transceiver in LTE BBU 502 is coupled to NFVI 420 over data links. The CPU in LTE BBU 502 executes the operating system, PHY, MAC, RLC, PDCP, and RRC to exchange LTE signaling and data with UEs 401, exchange LTE signaling and data with NFVI 420, and exchange 5GNR signaling with 5GNR gNodeBs 412-414.

In LTE radio 501, the antennas receive wireless LTE signals from UEs 401 that transport uplink signaling and uplink data. The antennas transfer corresponding electrical uplink signals through duplexers to the amplifiers. The amplifiers boost the received uplink signals for filters which attenuate unwanted energy. Demodulators down-convert the uplink signals from their carrier frequency. The analog/digital interfaces convert the analog uplink signals into digital uplink signals for the DSPs. The DSPs recover uplink symbols from the uplink digital signals. In LTE BBU 502, the CPU executes the network applications to process the uplink symbols and recover the uplink signaling and the uplink data. The network applications processes the uplink signaling and downlink signaling to generate new uplink signaling and new downlink signaling. The RRC transfers some of the new downlink signaling to 5GNR gNodeBs 412-414. The RRC transfers the new uplink signaling to NFVI 420. The PDCP transfer corresponding uplink data to NFVI 420.

In LTE BBU 502, the RRC receives the downlink signaling from NFVI 420. The PDCP receives downlink data from NFVI 420. The network applications process the new downlink signaling and the downlink data to generate corresponding downlink symbols that carry the downlink signaling and downlink data. In LTE radio 501, the DSP processes the downlink symbols to generate corresponding digital signals for the analog-to-digital interfaces. The analog-to-digital interfaces convert the digital downlink signals into analog downlink signals for modulation. Modulation up-converts the downlink signals to their carrier frequency. The amplifiers boost the modulated downlink signals for the filters which attenuate unwanted out-of-band energy. The filters transfer the filtered downlink signals through duplexers to the antennas. The electrical downlink signals drive the antennas to emit corresponding wireless LTE signals to UEs 401 that transport the downlink signaling and downlink data.

RRC functions comprise authentication, security, handover control, status reporting, Quality-of-Service (QoS), network broadcasts and pages, and network selection. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

LTE BBU 502 directs LTE radio 501 to wirelessly broadcasts a DC carrier in the middle of the LTE frequency band and to wirelessly transmit LTE reference signals throughout the LTE frequency band at a reference signal power. UEs 401 detect the DC carrier and locate the LTE reference signals. LTE BBU 502 and UEs 401 exchange LTE attachment signaling over LTE radio 501. LTE eNodeB 411 and NFVI 420 exchange S1 attachment signaling. NFVI 420 signals LTE BBU 502 to serve selected services to UEs 401 per designated QoS levels and network addresses. LTE BBU 502 signals UEs 401 over LTE radio 501 to indicate the selected services, QoS, and network addresses. UEs 401 and LTE BBU 502 exchange data over LTE radio 501 to deliver the services per the QoS using the network addresses. LTE BBU 502 and NFVI 420 exchange the data to deliver the selected services per the QoS using the network addresses.

LTE BBU 502 receives RSRP/RSRQ values for 5GNR gNodeBs 412-414 from UEs 401 over LTE radio 501. In this example, LTE BBU 502 selects 5GNR gNodeBs 412-414 to serve UEs 401 based on the RSRP/RSRQ reports. LTE BBU 502 signals selected 5GNR gNodeBs 412-414 to serve UEs 401. LTE BBU 502 signals NFVI 420 to serve UEs 401 over selected 5GNR gNodeBs 412-414.

LTE BBU 502 determines the amount of 5GNR gNodeBs 412-414 that serve UEs 401 for LTE eNodeB 411. LTE BBU 502 determines the individual amounts of UEs 401 that are served by individual 5GNR gNodeBs 412-414. LTE BBU 502 determines its uplink interference amounts. These amounts may averaged, grouped, scored, rounded, and the like. LTE BBU 502 receives uplink interference reports from 5GNR gNodeBs 412-414. LTE BBU 502 determines its LTE reference signal power based on the amount of 5GNR gNodeBs, UEs 401, and its own uplink interference. LTE BBU 502 increases LTE reference signal power as the amount of 5GNR gNodeBs, UEs, or uplink interference increases. LTE BBU 502 decreases LTE reference signal power as the amount of 5GNR gNodeBs, UEs, or uplink interference decreases. LTE BBU 502 determines individual 5GNR reference signal power levels for 5GNR gNodeBs 412-414 based on their individual amounts of UEs 401 and their individual uplink interference. LTE BBU 502 increases 5GNR reference signal power as the amount of UEs or uplink interference increases and decreases 5GNR reference signal power as the amount of UEs or uplink interference decreases. LTE BBU 502 signals the individual 5GNR reference power levels to the corresponding individual 5GNR gNodeBs 412-414.

LTE BBU 502 drives LTE radio 501 to wirelessly transmit reference signals throughout its frequency band at the selected LTE reference signal power. UEs 401 receive and process the reference signals to perform synchronization, channel estimation, uplink transmission, and downlink reception. UEs 401 and LTE BBU 502 wirelessly exchange data over LTE radio 501 to deliver the selected services per the QoS. LTE BBU 502 and NFVI 420 exchange the data to deliver the selected services per the QoS.

Figure 6:
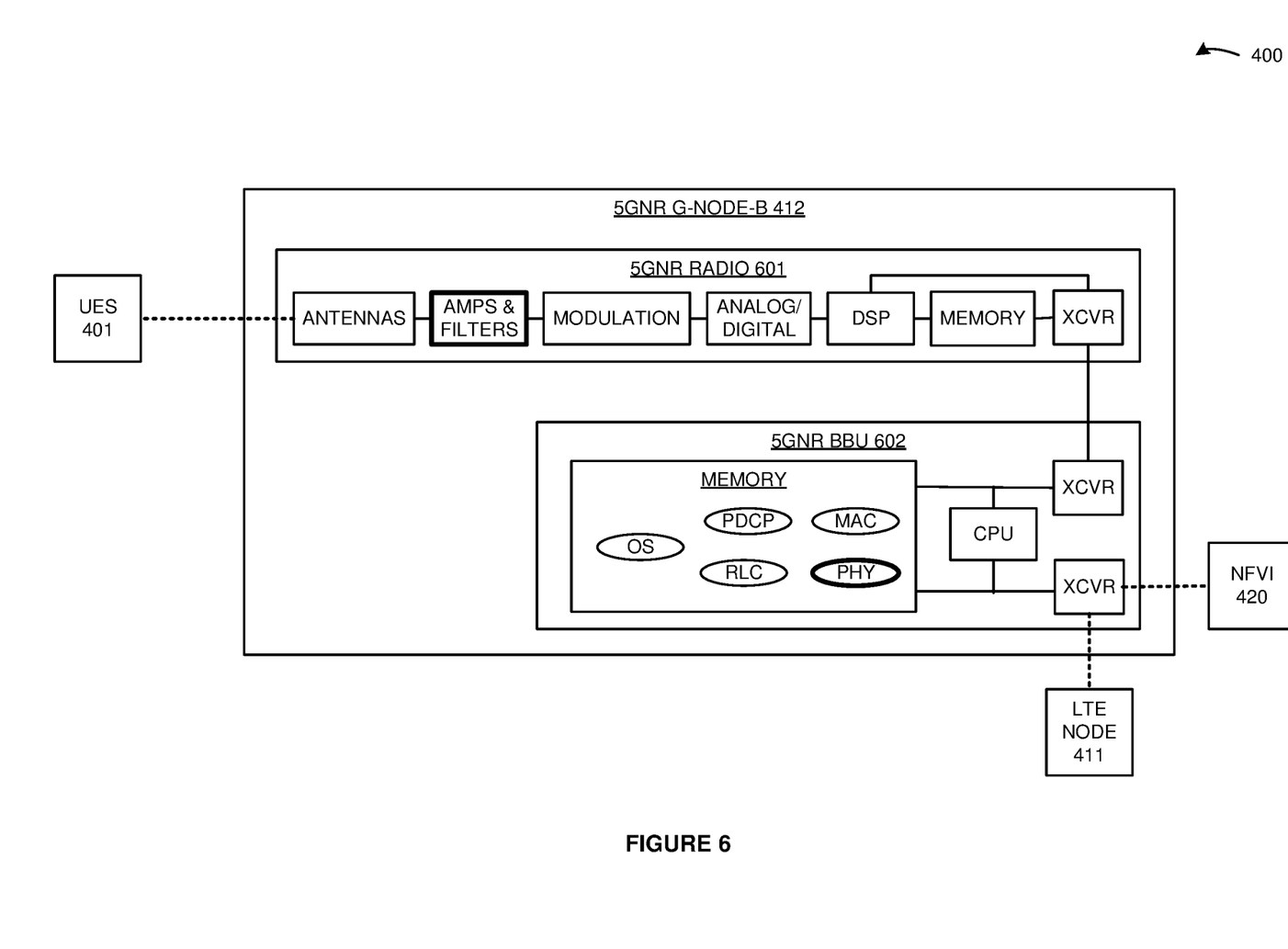
FIG. 6 illustrates a Fifth Generation New Radio (5GNR) gNodeB to wirelessly serve the UEs with the enhanced reference signals.

FIG. 6 illustrates 5GNR gNodeB 412 to wirelessly serve UEs 401 with the enhanced reference signals. 5GNR gNodeBs 413-414 would be similar. 5GNR gNodeB 412 comprises an example of secondary wireless access nodes 112-114, although secondary nodes 112-114 may differ. 5GNR gNodeB 412 comprises 5GNR radio 601 and 5GNR BBU 602. 5GNR radio 601 comprises antennas, amplifiers, filters, modulation, analog-to-digital interfaces, DSP, memory, and transceivers that are coupled over bus circuitry. 5GNR BBU 602 comprises memory, CPU, and transceivers that are coupled over bus circuitry. The memory in 5GNR BBU 602 stores an operating system and 5GNR network applications like PHY, MAC, RLC, and PDCP. UEs 401 are wirelessly coupled to the antennas in 5GNR radio 601 over 5GNR links. A transceiver in 5GNR radio 601 is coupled to a transceiver in 5GNR BBU 602 over enhanced CPRI (eCPRI) links. A transceiver in 5GNR BBU 602 is coupled to NFVI 420 over data links. The CPU in 5GNR BBU 602 executes the operating system, PHY, MAC, RLC, and PDCP to exchange 5GNR signaling and data with UEs 401, exchange 5GNR signaling and data with NFVI 420, and exchange 5GNR signaling with LTE eNodeB 411.

In 5GNR radio 601, the antennas receive wireless 5GNR signals from UEs 401 that transport uplink signaling and uplink data. The antennas transfer corresponding electrical uplink signals through duplexers to the amplifiers. The amplifiers boost the received uplink signals for filters which attenuate unwanted energy. Demodulators down-convert the uplink signals from their carrier frequency. The analog/digital interfaces convert the analog uplink signals into digital uplink signals for the DSPs. The DSPs recover uplink symbols from the uplink digital signals. In 5GNR BBU 602, the CPU executes the network applications to process the uplink symbols and recover the uplink signaling and the uplink data. The network applications processes the uplink signaling and downlink signaling to generate new uplink signaling and new downlink signaling. The PDCP transfers the new uplink signaling to LTE eNodeB 411. The PDCP transfer corresponding uplink data to NFVI 420.

In 5GNR BBU 602, the PDCP receives the downlink signaling from LTE eNodeB 411. The PDCP receives downlink data from NFVI 420. The network applications process the new downlink signaling and the downlink data to generate corresponding downlink symbols that carry the downlink signaling and downlink data. In 5GNR radio 601, the DSP processes the downlink symbols to generate corresponding digital signals for the analog-to-digital interfaces. The analog-to-digital interfaces convert the digital downlink signals into analog downlink signals for modulation. Modulation up-converts the downlink signals to their carrier frequency. The amplifiers boost the modulated downlink signals for the filters which attenuate unwanted out-of-band energy. The filters transfer the filtered downlink signals through duplexers to the antennas. The electrical downlink signals drive the antennas to emit corresponding wireless 5GNR signals to UEs 401 that transport the downlink signaling and downlink data.

PDCP functions comprise LTE interaction, security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

5GNR BBU 602 directs 5GNR radio 601 to wirelessly broadcast its DC carrier in the middle of its 5GNR radio frequency band. 5GNR BBU 602 drives 5GNR radio 601 to wirelessly transmit the 5GNR reference signals throughout the 5GNR frequency band at a 5GNR reference signal power. 5GNR BBU 602 receives signaling from LTE eNodeB 411 to serve UEs 401. UEs 401 and 5GNR BBU 602 wirelessly exchange data over 5GNR radio 601 to deliver the selected services per the QoS. 5GNR BBU 602 and NFVI 420 exchange the data to deliver the selected services per the QoS. 5GNR BBU 602 detects and reports the uplink interference at 5GNR radio 601 to LTE eNodeB 411. 5GNR BBU 602 receives a 5GNR reference power level from LTE eNodeB 411. 5GNR BBU 602 drives 5GNR radio 601 to wirelessly transmit 5GNR reference signals throughout the 5GNR frequency band at the designated 5GNR reference signal power.

Figure 7:
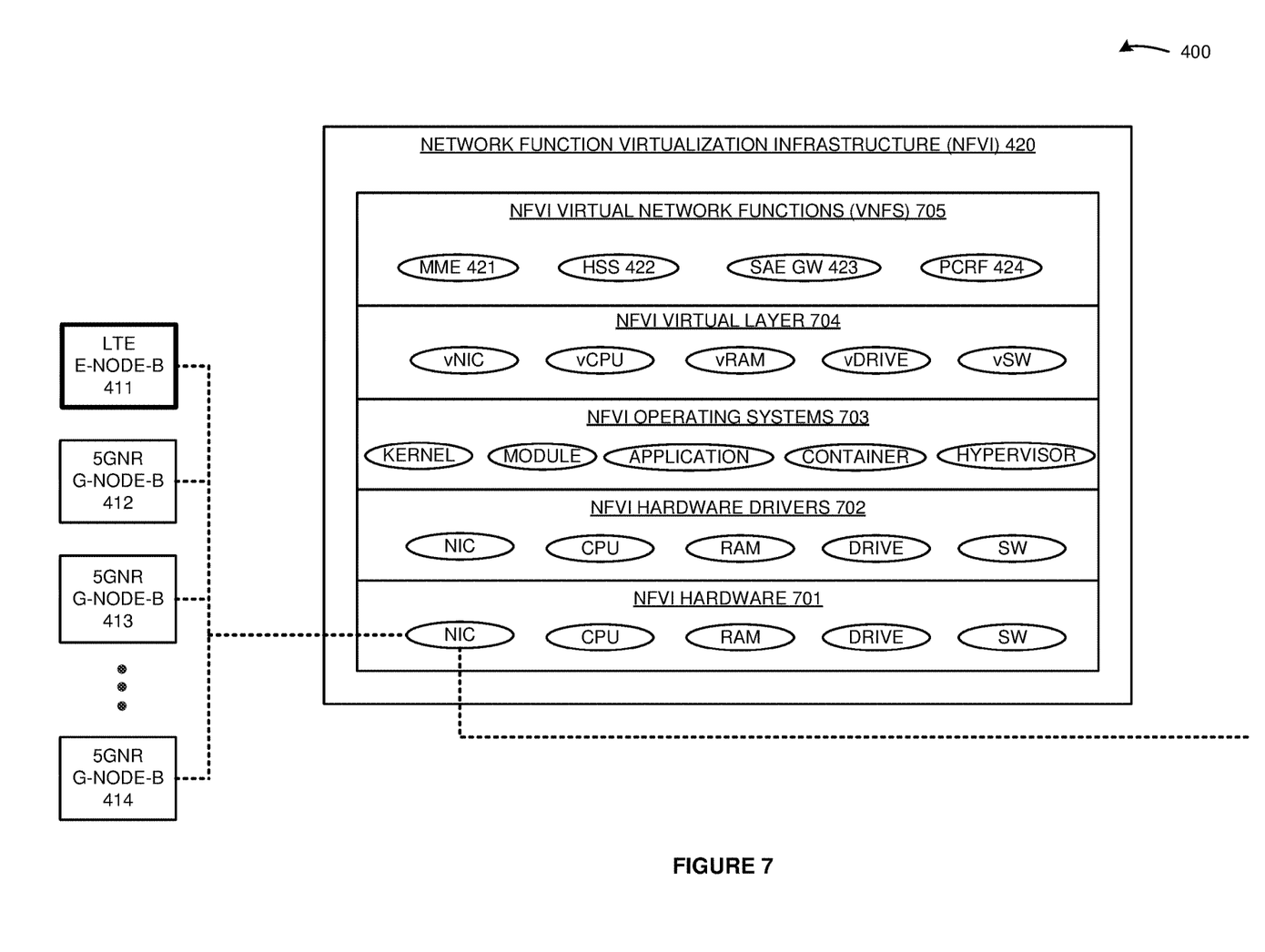
FIG. 7 illustrates a Network Function Virtualization Infrastructure (NFVI) to wirelessly serve the UEs over the NodeBs with the enhanced reference signals.

FIG. 7 illustrates Network Function Virtualization Infrastructure (NFVI) 420 to serve UEs 401 over NodeBs 411-414 that use the enhanced reference signals. NFVI 420 comprises NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NIC), CPU, RAM, flash/disk drives, and data switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises virtual NICs (vNIC), virtual CPUs (vCPU), virtual RAM (vRAM), virtual Drives (vDRIVE), and virtual Switches (vSW). NFVI VNFs 705 comprise MME 421, HSS 422, SAE GW 423, and PCRF 424. Other VNFs are typically present but are omitted for clarity. The NIC are coupled to NodeBs 411-414 and external systems. NFVI hardware 701 executes NFVI hardware drivers 702, NFVI operating systems 703, NFVI virtual layer 704, and NFVI VNFs 705 to serve UEs 401.

MME 421 and LTE eNodeB 411 exchange S1 attachment signaling for UEs 401. MME 421 and HSS 422 exchange signaling to authenticate and authorize UEs 401 and to select services for UEs 401. MME 421, SAE GW 423, and PCRF 424 exchange signaling to select QoS and network addresses for UEs 401. MME 421 signals LTE eNodeB 411 to serve UEs 401 per the QoS and network addresses. SAE GW 423 and LTE eNodeB 411 exchange the data to deliver the selected services per the QoS. SAE GW 423 exchanges the data with external systems to deliver the selected services per the QoS. MME 421 receives signaling from LTE eNodeB 411 to serve UEs 401 over selected 5GNR gNodeBs 412-414. MME 421 signals SAE GW 423 to serve UEs 401 over selected 5GNR gNodeBs 412-414. SAE GW 423 and 5GNR gNodeBs 412-414 exchange the data to deliver the selected services per the QoS. SAE GW 423 exchanges the data with external systems to deliver the selected services per the QoS.

Figure 8:
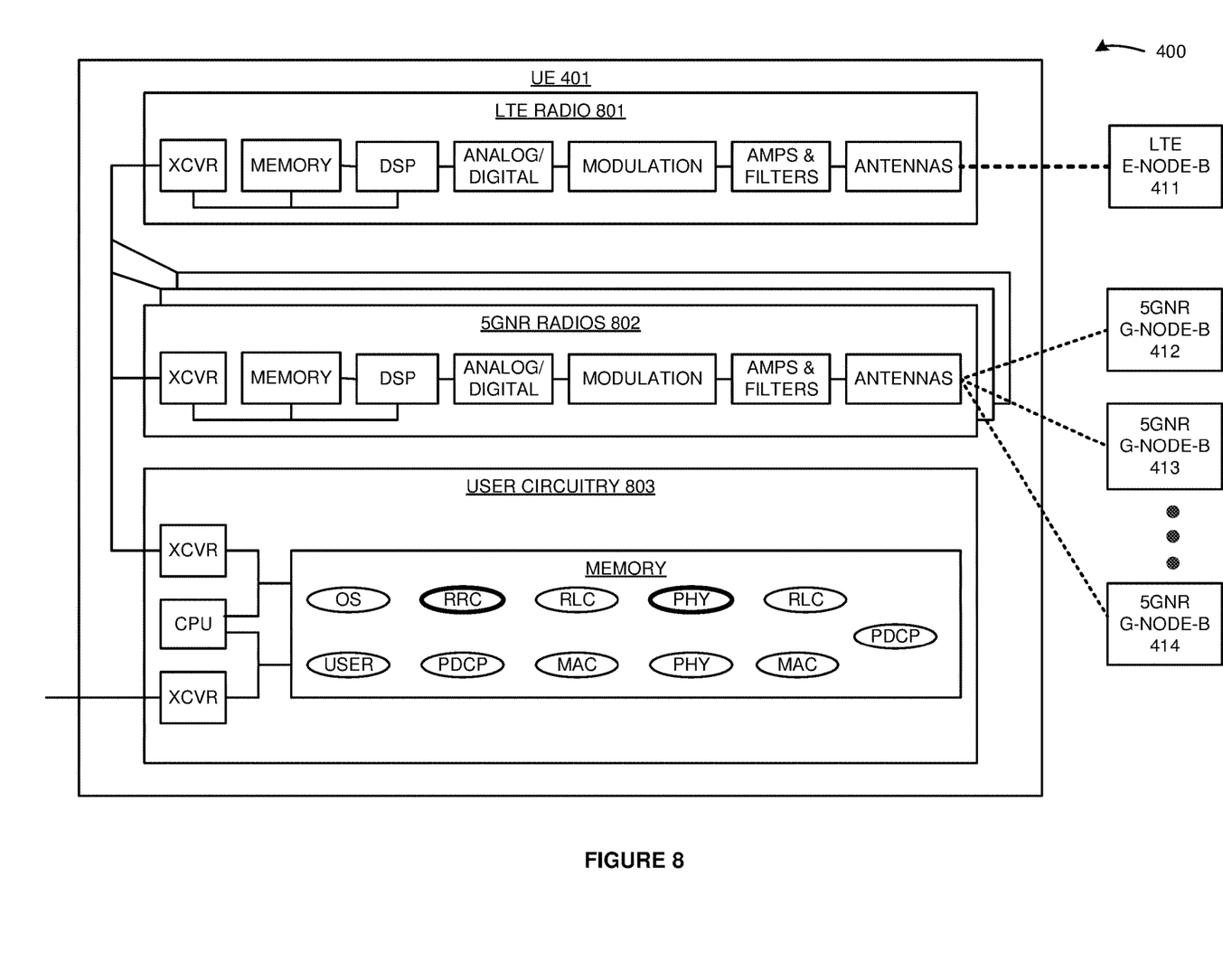
FIG. 8 illustrates one of the UEs that is wirelessly served with the enhanced reference signals.

FIG. 8 illustrates one of UEs 401 that is wirelessly served using the enhanced reference signals. UE 401 comprises an example of UEs 101, although UEs 101 may differ. UE 401 comprises LTE radio 801, 5GNR radios 502, and user circuitry 803. Radios 801-802 comprise antennas, amplifiers, filters, modulation, analog-to-digital interfaces, DSP, memory, and transceivers that are coupled over bus circuitry. User circuitry 803 comprises memory, CPU, and transceivers that are coupled over bus circuitry. The memory in user circuitry 803 stores an operating system and LTE/5GNR network applications like PHY, MAC, RLC, PDCP, and RRC. The antennas in LTE radio 801 is are wirelessly coupled to the antennas in LTE eNodeB 411 over LTE links. The antennas in 5GNR radios 802 are wirelessly coupled to the antennas in respective 5GNR gNodeBs 412-414 over 5GNR LTE links. Transceivers in radios 801-802 are coupled a transceivers in user circuitry 803. A transceiver in user circuitry 803 is coupled to external user systems. The CPU in user circuitry 803 executes the operating system, PHY, MAC, RLC, PDCP, and RRC to exchange LTE signaling and data with LTE eNodeB 411 and to exchange 5GNR signaling and data with 5GNR gNodeBs 412-414.

In radios 801-802, the antennas receive wireless signals from NodeBs 411-412 that transport downlink signaling and downlink data. The antennas transfer corresponding electrical downlink signals through duplexers to the amplifiers. The amplifiers boost the received downlink signals for filters which attenuate unwanted energy. Demodulators down-convert the downlink signals from their carrier frequency. The analog/digital interfaces convert the analog downlink signals into digital downlink signals for the DSPs. The DSPs recover downlink symbols from the downlink digital signals. In user circuitry 803, the CPU executes the network applications to process the downlink symbols and recover the downlink signaling and the downlink data. The network applications processes the downlink signaling and uplink signaling to generate new downlink signaling and new uplink signaling. The network applications transfer the new downlink signaling to the user applications. The PDCP transfer corresponding downlink data to the user applications.

In user circuitry 803, the network applications receive new uplink signaling and uplink data from the user applications. The network applications process the new uplink signaling and the uplink data to generate corresponding uplink symbols that carry the uplink signaling and uplink data. In radios 801-802, the DSP processes the uplink symbols to generate corresponding digital signals for the analog-to-digital interfaces. The analog-to-digital interfaces convert the digital uplink signals into analog uplink signals for modulation. Modulation up-converts the uplink signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless signals to NodeBs 411-414 that transport the uplink signaling and uplink data.

User circuitry 803 receives the DC carrier from LTE eNodeB 411 over LTE radio 801. User circuitry 803 receives the LTE reference signals throughout the LTE frequency band over LTE radio 801. User circuitry 803 detects the LTE DC carrier and locates the LTE reference signals. User circuitry 803 processes the LTE reference signals to perform synchronization, channel estimation, uplink transmission, and downlink reception with LTE eNodeB 411. User circuitry 803 and LTE eNodeB 411 exchange LTE attachment signaling over LTE radio 801. User circuitry 803 receives signaling from LTE eNodeB 411 that indicates selected services, QoS, and network addresses. User circuitry 803 and LTE eNodeB 411 wirelessly exchange data over LTE radio 801 to deliver the selected services per the QoS.

User circuitry 803 receives the DC carriers from 5GNR gNodeBs 412-424 over 5GNR radios 802. User circuitry 803 receives the 5GNR reference signals throughout the 5GNR frequency bands over 5GNR radios 802. User circuitry 803 detects the DC carriers and locates the 5GNR reference signals. User circuitry 803 processes the 5GNR reference signals to perform synchronization, channel estimation, uplink transmission, and downlink reception with 5GNR gNodeBs 412-414.

User circuitry 803 detects RSRP and RSRQ for 5GNR gNodeBs 412-414 during channel estimation. User circuitry 803 transfer the RSRP/RSRQ values for 5GNR gNodeBs 412-414 to LTE eNodeB 411 over LTE radio 801. User circuitry 803 receives signaling from LTE eNodeB 411 indicating selected 5GNR gNodeBs 412-414. User circuitry 803 wirelessly attaches to selected 5GNR gNodeBs 412-414 over 5GNR radios 802. User circuitry 803 and selected 5GNR gNodeBs 412-414 wirelessly exchange data over 5GNR radios 802 to deliver the selected services per the QoS.

Figure 9:
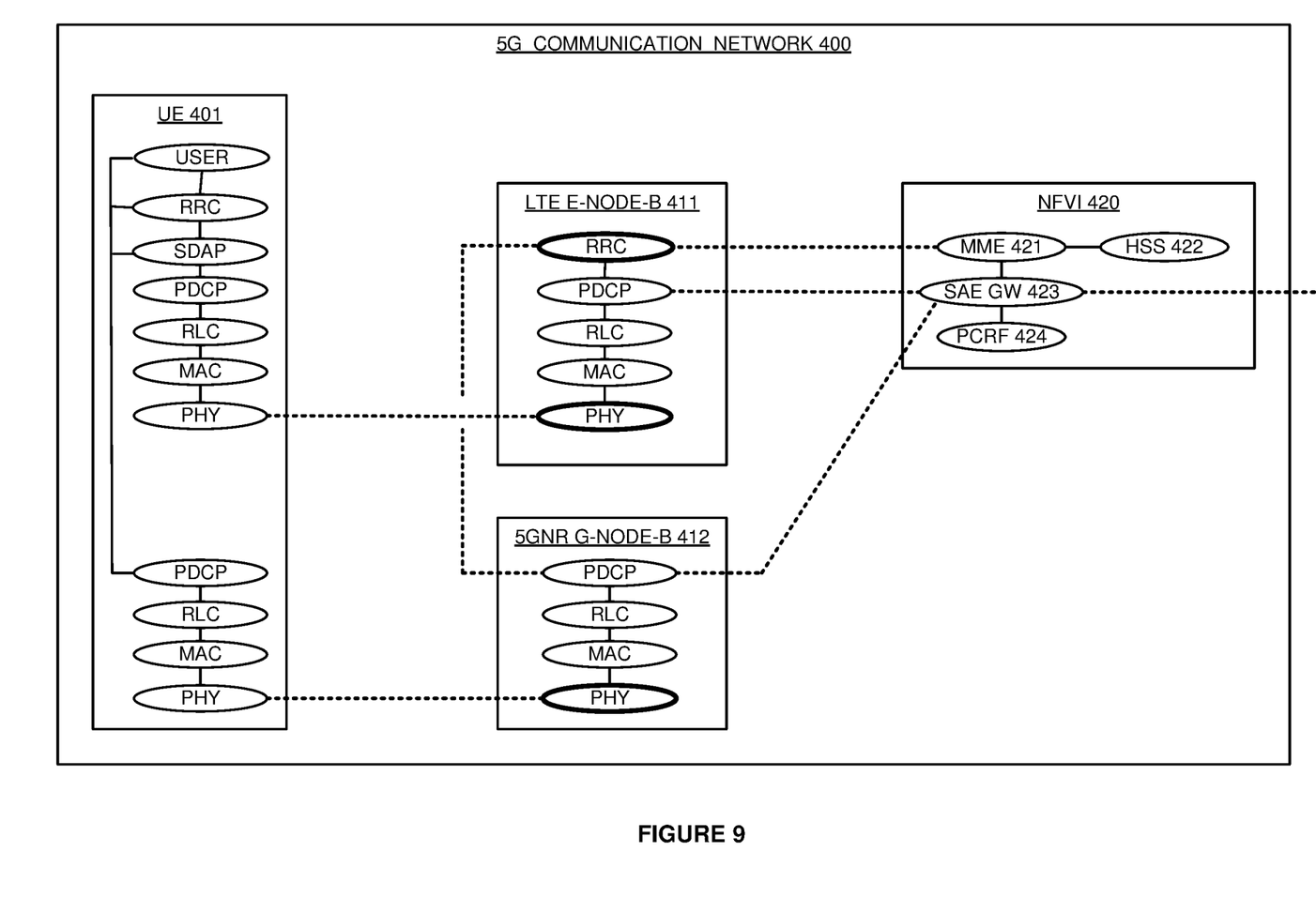
FIG. 9 illustrates an exemplary operation of the 5G communication network to serve the UE with the enhanced reference signals.

FIG. 9 illustrates an exemplary operation of 5G communication network 400 to serve one of UEs 401 using the enhanced reference signals. The PHY in LTE eNodeB 411 wirelessly broadcasts a DC carrier in the middle of the LTE frequency band. The PHY in LTE eNodeB 411 wirelessly transmits LTE reference signals throughout the LTE frequency band at a reference signal power level. The PHY in UE 401 detects the DC carrier and locates the LTE reference signals. The PHY in UE 401 processes the LTE reference signals to perform synchronization, channel estimation, uplink transmission, and downlink reception with LTE eNodeB 411.

The LTE RRC in UE 401 and the LTE RRC in LTE eNodeB 411 exchange LTE attachment signaling. The LTE RRC in LTE eNodeB 411 and MME 421 exchange 51 attachment signaling. MME 421 and HSS 422 exchange signaling to authenticate and authorize UE 401 and to select services for UE 401. MME 421, SAE GW 423, and PCRF 424 exchange signaling to select QoS and network addresses for UE 401. MME 421 signals the RRC in LTE eNodeB 411 to serve UE 401 per the QoS and network addresses. The RRC in LTE eNodeB 411 signals the RRC in UE 401 indicating the selected services, QoS, and network addresses. The PDCPs in UE 401 and LTE eNodeB 411 exchange user data to deliver the selected services per the QoS. The PDCP in LTE eNodeB 411 and SAE GW 423 exchange the data to deliver the selected services per the QoS. SAE GW 423 exchanges the data with external systems to deliver the selected services per the QoS.

The PHY in 5GNR gNodeB 412 (and the PHYS in other 5GNR gNodeBs) wirelessly broadcast their DC carriers. The PHY in 5GNR gNodeB 412 (and the PHYS in other 5GNR gNodeBs) wirelessly transmit 5GNR reference signals throughout the 5GNR frequency bands at reference signal power levels. The 5GNR PHYs in UE 401 detect the DC carriers and locate the 5GNR reference signals. The 5GNR PHYs in UE 401 receive and process the 5GNR reference signals to perform synchronization, channel estimation, uplink transmission, and downlink reception with 5GNR gNodeBs 412-414.

The 5GNR PHYs in UE 401 detect RSRP and RSRQ for 5GNR gNodeBs 412-414 during channel estimation. The PHYs in UE 401 transfer their RSRP/RSRQ values for 5GNR gNodeBs 412-414 to the 5GNR PDCP which forwards the RSRP/RSRQ values to the RRC in LTE eNodeB 411. In this example, the RRC in LTE eNodeB 411 selects only 5GNR gNodeB 412 to serve UE 401 (and the other UEs) based on the RSRP/RSRQ reports.

The RRC in LTE eNodeB 411 signals the PDCP in selected 5GNR gNodeB 412 to serve UE 401. The RC in LTE eNodeB 411 signals MME 421 to serve UE 401 over selected 5GNR gNodeB 412. MME 421 signals SAE GW 423 to serve UE 401 over selected 5GNR gNodeB 412. The PDCP in UE 401 and selected 5GNR gNodeB 412 wirelessly exchange data to deliver the selected services per the QoS. 5GNR gNodeB 412 and SAE GW 423 exchange the data to deliver the selected services per the QoS. SAE GW 423 exchanges the data with external systems to deliver the selected services per the QoS.

The RRC in LTE eNodeB 411 determines the amount of selected 5GNR gNodeBs that serve UE 401 for LTE eNodeB 411. The RRC in LTE eNodeB 411 determines the individual amounts of UEs (only UE 401 is shown) that are served by selected 5GNR gNodeB 412. The RRC in LTE eNodeB 411 determines its uplink interference as detected by the PHY. The PHY in 5GNR gNodeB 412 detects uplink interference and the PDCP reports the uplink interference to the RRC in LTE eNodeB 411.

The RRC in LTE eNodeB 411 determines its LTE reference signal power based on the amount of 5GNR gNodeBs, the amount of served UEs, and its own uplink interference. The RRC in LTE eNodeB 411 determines a 5GNR reference signal power level for 5GNR gNodeB 412 based on its individual amounts of UEs and its uplink interference. The RRC in LTE eNodeB 411 signals the 5GNR reference power level to 5GNR gNodeB 412.

In LTE eNodeB 411, the PHY transmits subsequent reference signals throughout the LTE frequency band at the selected LTE reference signal power. The PHY in UE 401 receives and process the LTE reference signals to perform synchronization, channel estimation, uplink transmission, and downlink reception. The PDCPs in UE 401 and LTE eNodeB 411 exchange data to deliver the selected services per the QoS. The RRC in LTE eNodeB 411 and SAE GW 423 exchange the data to deliver the selected services per the QoS. SAE GW 423 exchanges the data with external systems to deliver the selected services per the QoS.

The PHYs in 5GNR gNodeBs 412-424 wirelessly transmit subsequent reference signals throughout their frequency bands at the selected reference signal power levels. The PHYs in UE 401 receive and process the reference signals to perform synchronization, channel estimation, uplink transmission, and downlink reception. The PDCPs in UE 401 and selected 5GNR gNodeB 412 wirelessly exchange data to deliver the selected services per the QoS. The PDCP in 5GNR gNodeB 412 and SAE GW 423 exchange the data to deliver the selected services per the QoS. SAE GW 423 exchanges the data with external systems to deliver the selected services per the QoS.

The wireless data network circuitry described above comprises computer hardware and software that form special-purpose network circuitry to wirelessly serve UEs with enhanced reference signals. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to wirelessly serve UEs with enhanced reference signals.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a primary access node to wirelessly serve User Equipment (UEs), the method comprising:
    a radio wirelessly transmitting reference signals at an initial reference power level, wirelessly exchanging data signals with the UEs at data power levels, and exchanging corresponding data with baseband circuitry;
    the baseband circuitry exchanging the corresponding data with the radio, exchanging the corresponding data with one or more network elements, and exchanging signaling with secondary access nodes, wherein the secondary access nodes wirelessly exchange additional data with the UEs and exchange the additional data with the one or more network elements responsive to the signaling;
    the baseband circuitry determining an amount of the secondary access nodes and determining individual amounts of the UEs that wirelessly exchange the additional data with individual ones of the secondary access nodes;
    the baseband circuitry determining a new reference power level, to enhance the reference signals, based on the amount of the secondary access nodes and the individual amounts of the UEs;
    the baseband circuitry determining secondary reference power levels for the individual ones of the secondary access nodes based on the individual amounts of the UEs;
    the radio wirelessly transmitting the reference signals at the new reference power level; and
    the baseband circuitry signaling the secondary reference power levels to the individual ones of the secondary access nodes, wherein the individual ones of the secondary access nodes transmit corresponding secondary reference signals at a corresponding one of the secondary reference power levels.

2. The method of claim 1, wherein:
    the baseband circuitry determining the individual amounts of the UEs that wirelessly exchange the additional data with the secondary access nodes comprises determining individual amounts of Radio Resource Control (RRC) connected UEs that wirelessly exchange the additional data with the individual ones of the secondary access nodes; and
    the baseband circuitry determining the new reference power level based on the amount of the secondary access nodes and the individual amounts of the UEs comprises determining the new reference power level based on the amount of the secondary access nodes and the individual amounts of the RRC Connected UEs.

3. The method of claim 2, wherein the baseband circuitry determining the secondary reference power levels for the individual ones of the secondary access nodes based on the individual amounts of the UEs comprises determining the secondary reference power levels for the individual ones of the secondary access nodes based on the individual amounts of the RRC connected UEs.

4. The method of claim 1, wherein the baseband circuitry determining the new reference power level to enhance the reference signals comprises increasing the initial reference power level when at least one of the amount of the secondary access nodes or the individual amounts of the UEs increases.

5. The method of claim 1, wherein the baseband circuitry determining the new reference power level to enhance the reference signals comprises decreasing the initial reference power level when at least one of the amount of the secondary access nodes or the individual amounts of the UEs decreases.

6. The method of claim 1, further comprising:
    the baseband circuitry determining historical UE amounts that are served by the individual ones of secondary access nodes at a current day, date, and time and wherein:
    the baseband circuitry determining the new reference power level comprises determining the new reference power level based on the amount of the secondary access nodes, the individual amounts of the UEs, and the historical UE amounts.

7. The method of claim 6, wherein the baseband circuitry determining the secondary reference power levels for the individual ones of the secondary access nodes comprises determining the secondary reference power levels for the individual ones of the secondary access nodes based on the individual amounts of the UEs and the individual historical UE amounts.

8. The method of claim 1, further comprising:
    the baseband circuitry determining an amount of interference at the radio; and wherein:
    the baseband circuitry determining the new reference power level comprises determining the new reference power level based on the amount of the secondary access nodes, the individual amounts of the UEs, and the amount of the interference at the radio.

9. The method of claim 8, further comprising:
    the baseband circuitry determining individual amounts of secondary interference at the individual ones of the secondary access nodes and wherein:
    the baseband circuitry determining the secondary reference power levels for the individual ones of the secondary access nodes comprises determining the secondary reference power levels for the individual ones of the secondary access nodes based on the individual amounts of the UEs and the individual amounts of secondary interference.

10. The method for claim 1, wherein the primary access nodes comprises a Long Term Evolution (LTE) access node and the secondary access nodes comprise Fifth Generation New Radio (5GNR) access nodes.

11. A primary access node to wirelessly serve User Equipment (UEs), the primary access node comprising:
    a radio configured to wirelessly transmit reference signals at an initial reference power level, wirelessly exchange data signals with the UEs at data power levels, and exchange corresponding data with baseband circuitry;

the baseband circuitry configured to exchange the corresponding data with the radio, exchange the corresponding data with one or more network elements, and exchange signaling with secondary access nodes, wherein the secondary access nodes are configured to wirelessly exchange additional data with the UEs and exchange the additional data with the one or more network elements responsive to the signaling;

the baseband circuitry configured to determine an amount of the secondary access nodes and determine individual amounts of the UEs that wirelessly exchange the additional data with individual ones of the secondary access nodes;

the baseband circuitry configured to determine a new reference power level, to enhance the reference signals, based on the amount of the secondary access nodes and the individual amounts of the UEs;

the baseband circuitry configured to determine secondary reference power levels for the individual ones of the secondary access nodes based on the individual amounts of the UEs;

the radio configured to wirelessly transmit the reference signals at the new reference power level; and the baseband circuitry configured to signal the secondary reference power levels to the individual ones of the secondary access nodes, wherein the individual ones of the secondary access nodes transmit corresponding secondary reference signals at a corresponding one of the secondary reference power levels.

12. The primary access node of claim 11, wherein the baseband circuitry is configured to determine individual amounts of Radio Resource Control (RRC) connected UEs that wirelessly exchange the additional data with the individual ones of the secondary access nodes and determine the new reference power level based on the amount of the secondary access nodes and the individual amounts of the RRC connected UEs.

13. The primary access node of claim 12, wherein the baseband circuitry is configured to determine the secondary reference power levels for the individual ones of the secondary access nodes based on the individual amounts of the RRC connected UEs.

14. The primary access node of claim 11, wherein the baseband circuitry is configured to determine the new reference power level to enhance the reference signals comprises the baseband circuitry configured to increase the initial reference power level when at least one of the amount of the secondary access nodes or the individual amounts of the UEs increases.

15. The primary access node of claim 11, wherein the baseband circuitry is configured to determine the new reference power level to enhance the reference signals comprises the baseband circuitry configured to decrease the initial reference power level when at least one of the amount of the secondary access nodes or the individual amounts of the UEs decreases.

16. The primary access node of claim 11, further comprising the baseband circuitry configured to determine historical UE amounts that are served by the individual ones of the secondary access nodes at a current day, date, and time, and determine the new reference power level based on the amount of the secondary access nodes, the individual amounts of the UEs, and the historical UE amounts.

17. The primary access node of claim 16, wherein the baseband circuitry is configured to determine the secondary reference power levels for the individual ones of the secondary access nodes based on the individual amounts of the UEs individual historical UE amounts.

18. The primary access node of claim 11, further comprising the baseband circuitry configured to determine an amount of interference at the radio and determine the new reference power level based on the amount of the secondary access nodes, the individual amounts of the UEs, and the amount of the interference at the radio.

19. The primary access node of claim 18, further comprising:

the baseband circuitry configured to determine individual amounts of secondary interference at the individual ones of the secondary access nodes; and wherein:

the baseband circuitry is configured to determine the secondary reference power level for the individual ones of the secondary access nodes based on the individual amounts of the UEs and the individual amounts of secondary interference.

20. The primary access node of claim 11, wherein the primary access nodes comprises a Long Term Evolution (LTE) access node and the secondary access nodes comprise Fifth Generation New Radio (5GNR) access nodes.

* * * * *